(12) United States Patent
Bruford et al.

(10) Patent No.: US 11,161,447 B2
(45) Date of Patent: Nov. 2, 2021

(54) CARGO/PAYLOAD SECUREMENT SYSTEM FOR TRUCKS/TRAILERS

(71) Applicant: Opus Mach LLC, Warren, MI (US)

(72) Inventors: Dave Bruford, Warren, MI (US); Paul Tennant, Warren, MI (US); Tom Dennis, Warren, MI (US); Dee Kapur, Warren, MI (US); Aleyna Kapur, Warren, MI (US)

(73) Assignee: Opus Mach LLC, Warren, MI (US)

( * ) Notice: Subject to any disclaimer, the term of this patent is extended or adjusted under 35 U.S.C. 154(b) by 151 days.

(21) Appl. No.: 16/561,084

(22) Filed: Sep. 5, 2019

(65) Prior Publication Data

US 2020/0079272 A1    Mar. 12, 2020

Related U.S. Application Data

(60) Provisional application No. 62/728,159, filed on Sep. 7, 2018.

(51) Int. Cl.
*B60P 7/13* (2006.01)
*B60P 7/135* (2006.01)
*B60P 7/08* (2006.01)

(52) U.S. Cl.
CPC ............. *B60P 7/135* (2013.01); *B60P 7/0823* (2013.01); *B60Y 2200/14* (2013.01)

(58) Field of Classification Search
CPC ........... B60P 7/135; B60P 7/0892; B60P 7/15; B60P 7/14; B60P 3/077; B60P 7/0815; B60P 7/12; B60P 3/40; B60P 7/08; B60P 7/0807

USPC .. 410/121, 94, 129, 143, 31, 4, 49, 96, 149, 410/156, 34, 32, 46
See application file for complete search history.

(56) References Cited

U.S. PATENT DOCUMENTS

| | | | | |
|---|---|---|---|---|
| 2,340,374 A * | 2/1944 | George | ................ | B61D 45/006 410/139 |
| 2,546,929 A * | 3/1951 | Nampa | ................ | B61D 45/006 410/147 |
| 3,984,118 A * | 10/1976 | Wilson | ...................... | B60P 7/08 410/121 |
| 4,193,739 A * | 3/1980 | Lucey | .................... | F01D 25/34 415/118 |
| 4,498,824 A * | 2/1985 | Kinkle | ...................... | B60P 7/14 410/121 |
| D653,774 S * | 2/2012 | Kubota | ........................ | D25/126 |

* cited by examiner

*Primary Examiner* — D Glenn Dayoan
*Assistant Examiner* — Sunsurraye Westbrook
(74) *Attorney, Agent, or Firm* — Harness, Dickey & Pierce, P.L.C.

(57) ABSTRACT

The present disclosure provides a cargo securement system for use in various types of cargo areas of transportation vehicles or in other applications where is desirable to secure payloads, materials, goods, products or other cargo in position to prevent unwanted or undesired movement or repositioning. The cargo securement system is flexible and adaptable or configurable for installation in a variety of cargo areas having different sizes, dimensions and constructions.

18 Claims, 22 Drawing Sheets

CARGO/PAYLOAD SECUREMENT SYSTEM FOR TRUCKS/TRAILERS

CROSS-REFERENCE TO RELATED APPLICATIONS

This application claims the benefit of U.S. Provisional Application No. 62/728,159, filed on Sep. 7, 2018. The entire disclosure of the above application is incorporated herein by reference.

FIELD

The present disclosure relates to cargo/payload securement systems for trucks and/or trailers.

BACKGROUND

This section provides background information related to the present disclosure which is not necessarily prior art.

Trucks, trains, ships and other modes of transportation often include cargo areas that are used to transport various materials, products, or other goods. Such cargo areas can have various configurations and can have various sizes and shapes. The goods that are transported in such cargo areas need to be secured to prevent the goods from moving in the cargo areas. Given the different types of transportation vehicles and the various sizes and shapes of cargo areas, an improved cargo securement system is needed that can adapt to the various transportation environments and to the various sizes and shapes that need to be secured in position during transport.

SUMMARY

This section provides a general summary of the disclosure, and is not a comprehensive disclosure of its full scope or all of its features.

In one example in accordance with the present disclosure, a cargo securement system includes a free-standing post with a footing and a base including a flange and a slot. The flange is configured to secure the base in a cargo area of a transportation vehicle. The slot is shaped to removably receive an anchor portion of the footing to support the post in a substantially vertical position. The anchor portion of the footing and the slot have cooperating arcuate cross-sectional profiles to maintain the post in the vertical position relative to the base when cargo is secured to the post.

The cargo securement systems of the present disclosure provide many advantages over traditional or known systems of cargo securement. In one aspect of the present disclosure, the cargo securement system provides a stable and secure support structure to which cargo of various sizes and shapes can be secured in position during transport.

In another aspect, the cargo securement systems of the present disclosure can be easily moved from a deployed position in which the posts of the system are positioned in an upright position in the cargo area to a stowed position in which the posts are removed from the upright position in the cargo area. Such flexibility permits the cargo securement system to be quickly deployed and/or stowed depending on the size of the cargo to be transported or other needs of the user.

In another aspect, the cargo securement systems of the present disclosure are configured such that one individual user can install the posts into the deployed position. The user can reposition the components of the system and install the posts into the upright, deployed position without the need of any tools or specialized equipment.

In another aspect, the cargo securement system advantageously can be installed into cargo areas that do not have rigid walls, ceilings or other surrounding support structures. The cargo securement systems can be mounted to a floor and not to a wall or ceiling structure. The cargo securement systems are able to provide a stable support structure for cargo despite being removably mounted to the floor. Such an advantage is particularly useful in the context of curtain-side trucks and flat-bed trailers, for example.

In another aspect, the cargo securement systems of the present disclosure are relatively small such that the valuable surface area in the cargo area is not obscured by a support structure. The cargo securement system can be positioned in the center of the cargo area with the ability to retain cargo positioned on either side of the system. In addition, when the cargo securement system is in the stowed position, the bases of the cargo securement system do not obstruct the cargo area.

In still another aspect, the cargo securement systems of the present disclosure can be retrofit into existing cargo areas or can be installed into new cargo areas or cargo areas that do not have existing securement features.

In another form, the present disclosure provides a cargo securement system including a base and a post removably coupled to the base. The base is secured to and disposed within an aperture of a cargo platform of a vehicle and includes a body portion and a flange extending radially outwardly from the body portion. The body portion includes an opening formed therein. The post includes an elongated column member and a footing coupled to an end of the column member. The footing is at least partially received in the opening formed in the body portion of the base when the post is coupled to the base and is removed from the opening when the post is separated from the base.

In some configurations of the cargo securement system of the above paragraph, a top surface of the base is flush with a top surface of the cargo platform.

In some configurations of the cargo securement system of any one or more of the above paragraphs, fasteners extend through the flange portion of the base and the cargo platform to secure the base to the cargo platform.

In some configurations of the cargo securement system of any one or more of the above paragraphs, the footing includes a neck portion, an anchor portion and a support ledge positioned between the neck portion and the anchor portion and seated on the base. The anchor portion is received in the opening formed in the body portion of the base when the post is coupled to the base.

In some configurations of the cargo securement system of any one or more of the above paragraphs, a length of the anchor portion is smaller than a length of the column member of the post.

In some configurations of the cargo securement system of any one or more of the above paragraphs, the anchor portion includes opposing arcuate shaped walls that correspond to opposing arcuate shaped walls of the opening.

In some configurations of the cargo securement system of any one or more of the above paragraphs, the opening defines a bottom surface. A gap exists between the bottom surface and an end of the anchor portion.

In some configurations of the cargo securement system of any one or more of the above paragraphs, an elongated retention grid is attached to a surface of the column member and includes a plurality of attachment points spaced apart from each other.

In some configurations of the cargo securement system of any one or more of the above paragraphs, the cargo securement system includes another base and another post. The another base is secured to the cargo platform of the vehicle and the another post is removably coupled to the another base.

In yet another form, the present disclosure provides a cargo securement system for securing cargo in a cargo area of a vehicle. The cargo securement system includes a base, a post and an elongated retention grid. The base is secured to and disposed within an aperture of a cargo platform of the cargo area and includes a body portion and a flange extending radially outwardly from the body portion. The body portion includes an opening formed therein. The opening defines a bottom surface. The post is removably coupled to the base and includes an elongated column member and footing. The footing is coupled to an end of the column member and is at least partially received in the opening formed in the body portion of the base when the post is coupled to the base and removed from the opening when the post is separated from the base. The footing includes a neck portion, an anchor portion and a support ledge positioned between the neck portion and the anchor portion and seated on the base. The neck portion is coupled to and disposed at least partially into the column member. The anchor portion is received in the opening formed in the body portion of the base when the post is coupled to the base and includes opposing arcuate shaped walls that correspond to opposing arcuate shaped walls of the opening. The elongated retention grid is attached to a surface of the column member and includes a plurality of attachment points spaced apart from each other. A gap exists between the bottom surface of the opening and an end of the anchor portion when the post is coupled to the base.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The cargo securement systems of the present disclosure can be used in various cargo areas. The example cargo securement systems of the present disclosure are flexible systems that can be adapted or configured to and/or installed in cargo areas of different dimensions, and of different types for multiple different transportation vehicles or for other applications in which it is desirable to secure materials, goods, products or other cargo in position to prevent movement. While the examples described herein describe a cargo securement system used in a curtain-side truck, the cargo securement systems can be used in other vehicles, trucks, trailers, flatbeds, trains, boats, compartments or warehouse environments and other applications.

Figure 1:
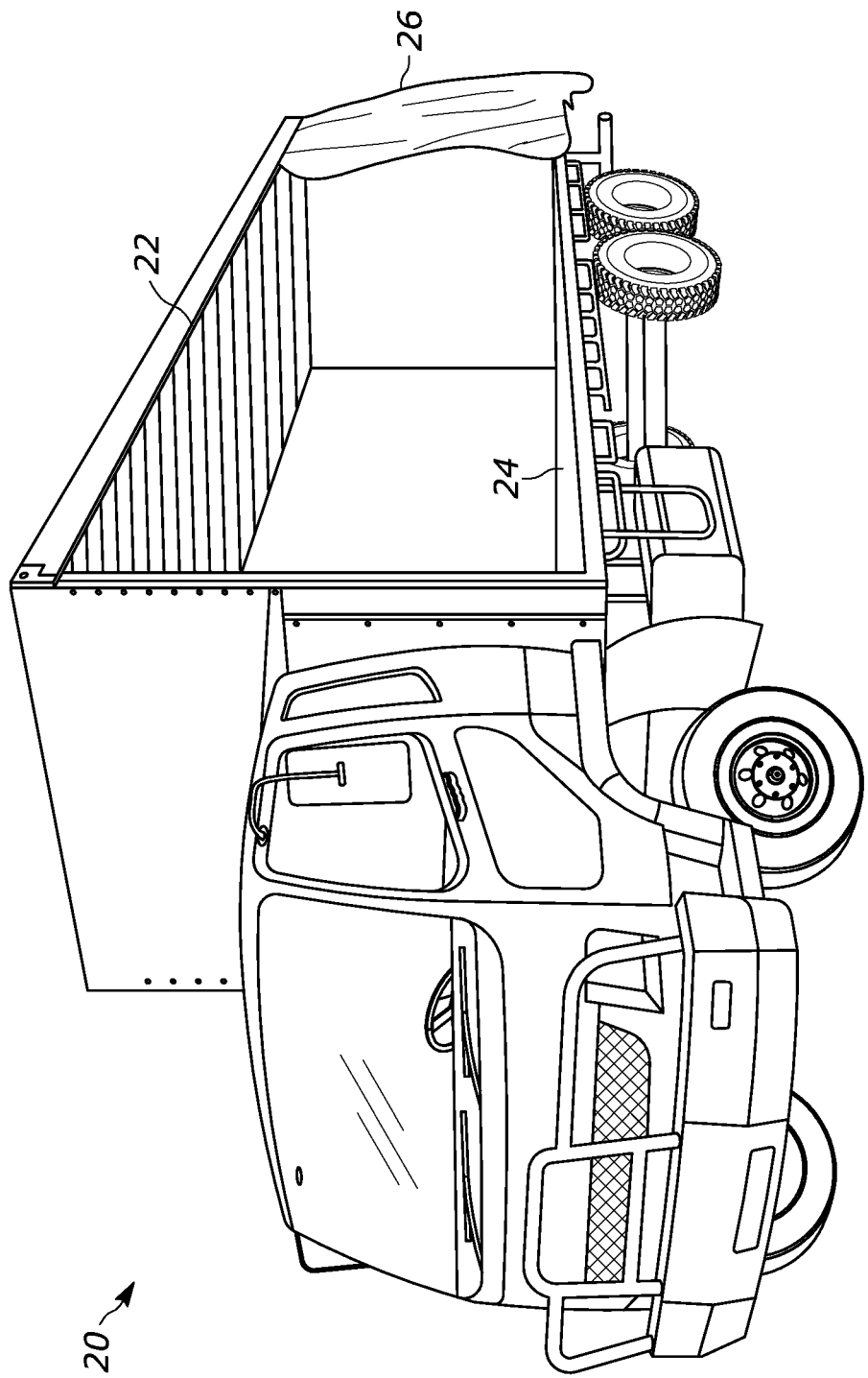
FIG. 1 is an illustration of a curtain-side truck in which the cargo securement systems of the present disclosure can be used.
Figure 2:
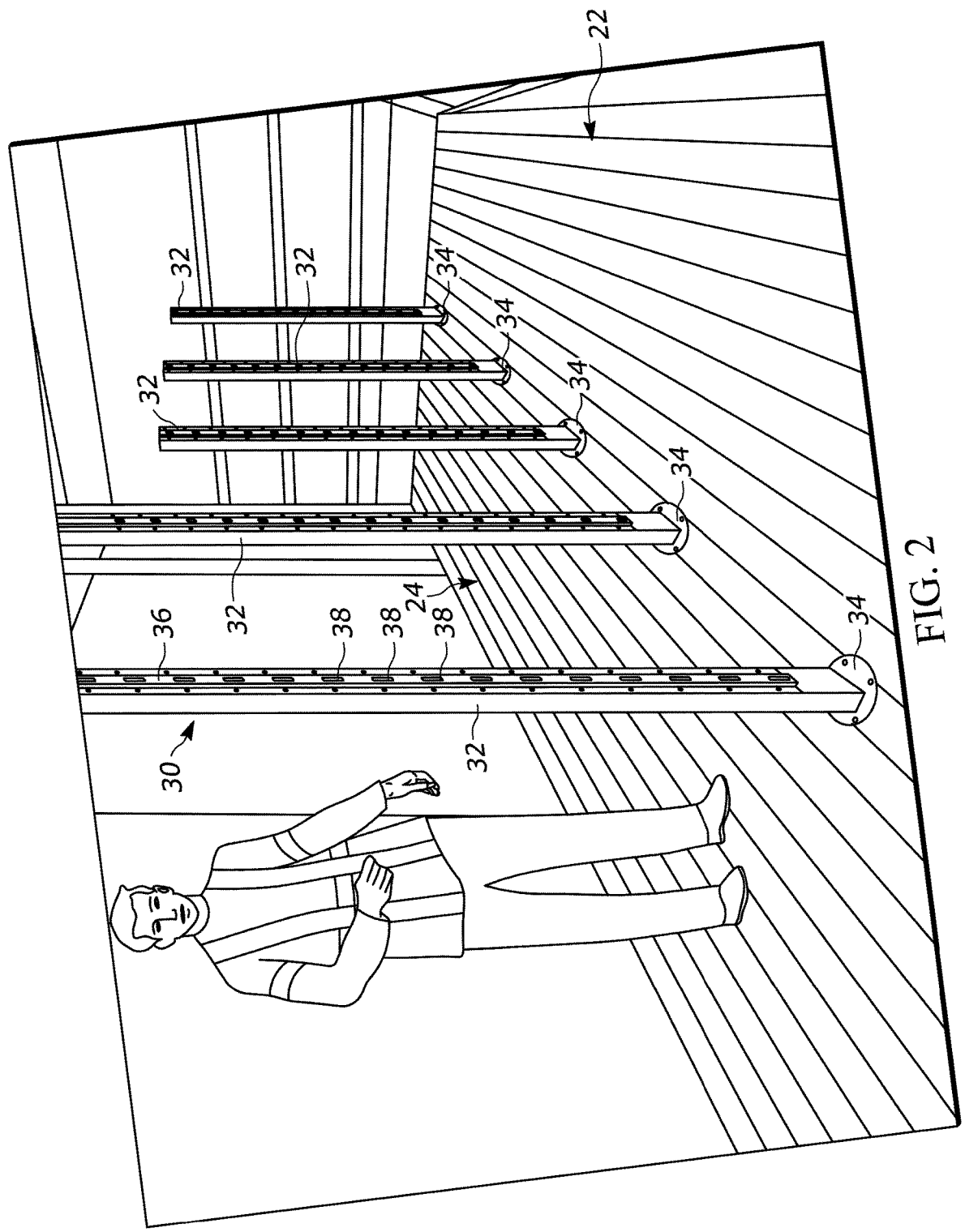
FIG. 2 is a photograph of an example cargo securement system of the present disclosure installed in the cargo area of a curtain-side truck.

Referring now to FIGS. 1 and 2, a cargo securement system 30 is used, in the example shown, in the cargo area 22 of a curtain-side truck 20. In such an environment, the cargo area 22 includes a cargo platform 24 on which cargo can be placed. The side panels (or curtains) 26 of the curtain-side truck 20 are made of a flexible material and can slide to cover the cargo area 22 or be retracted to expose the cargo area 22 as shown in FIG. 1. Since the side panels 26 of the curtain-side truck 20 are not rigid, it can be challenging to secure cargo inside the cargo area 22 to prevent the cargo from moving.

The cargo securement system 30 as shown in FIG. 2 can be used in such an environment to secure cargo in the cargo area 22. The cargo securement system 30 can include one or more free-standing posts 32 that are inserted into bases 34. The posts 32 may be made of a metallic material (e.g., aluminum, stainless steel, etc.) and may be generally rectangular-shaped. In some configurations, the posts 32 may be made of other materials (e.g., plastics, composites, and the like) that provide strength and rigidity, and may also have other shapes (e.g., square, triangular, circular, etc.) that facilitate securement of cargo loads thereto. The bases 34 are secured into the cargo area 22. As shown, the bases 34 can be installed into the platform 24 (e.g., floor) of the cargo area 22. The posts 32 can be easily inserted into and removed from the bases 34. The posts 32 can include elongated retention grids 36 that are connected to opposing surfaces of the posts 32. Each retention grid 36 may extend from a bottom end of a respective post 32 to a top end of the respective post 32. Each retention grid 36 includes a series of attachment points 38 that are spaced apart from each other and are positioned along a length of the grid 36 from a bottom end thereof to a top end thereof. Cargo straps, ropes, bungee cords, or other securing members can be attached to the attachment points 38 to retain cargo in position adjacent to the posts 32. In some configurations, the posts 32 may include a single retention grid 36 connected thereto as opposed to a plurality of retention grids 36 connected thereto.

Figure 3:
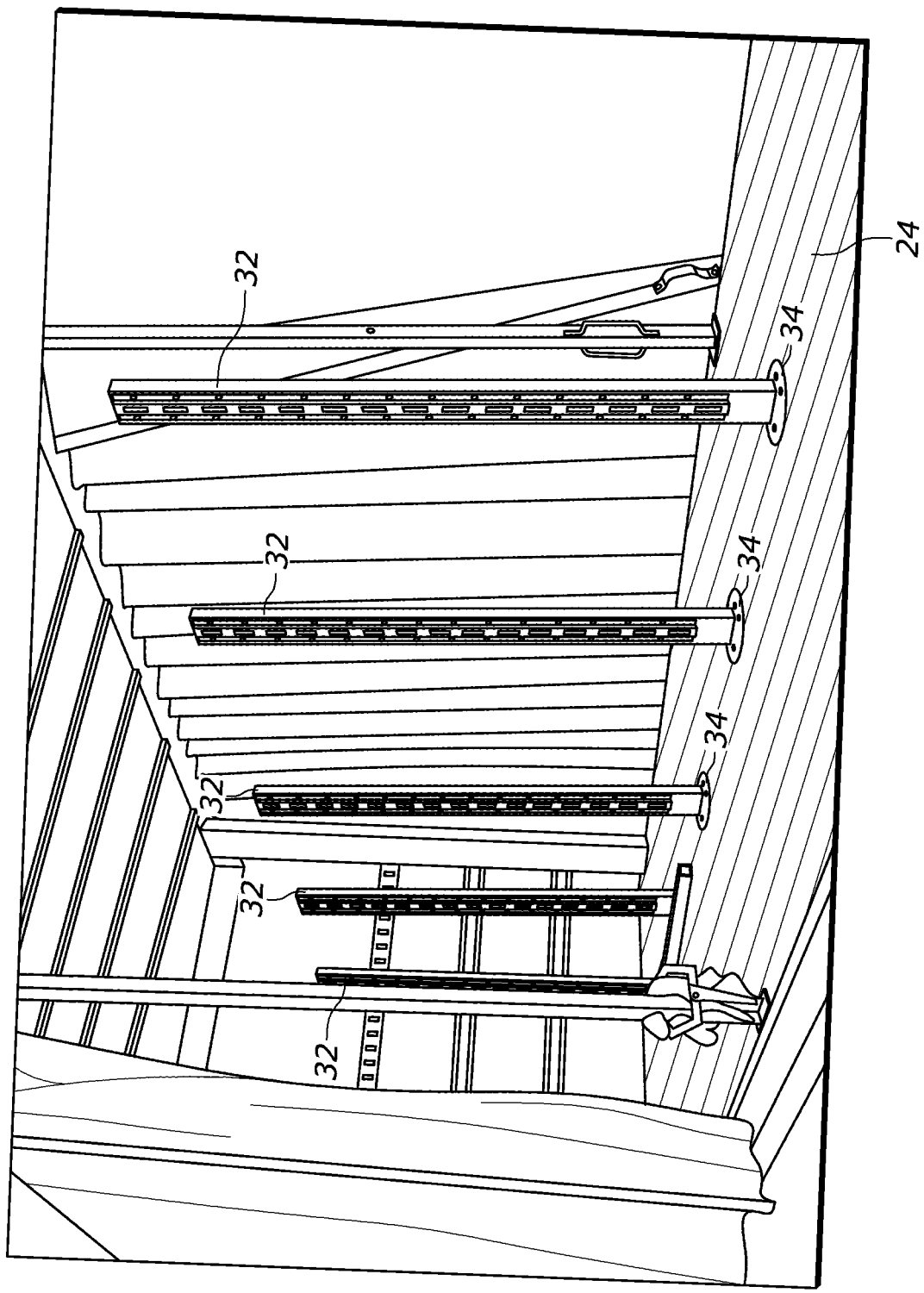
FIG. 3 is another photograph of the example cargo securement system of FIG. 2.
Figure 4:
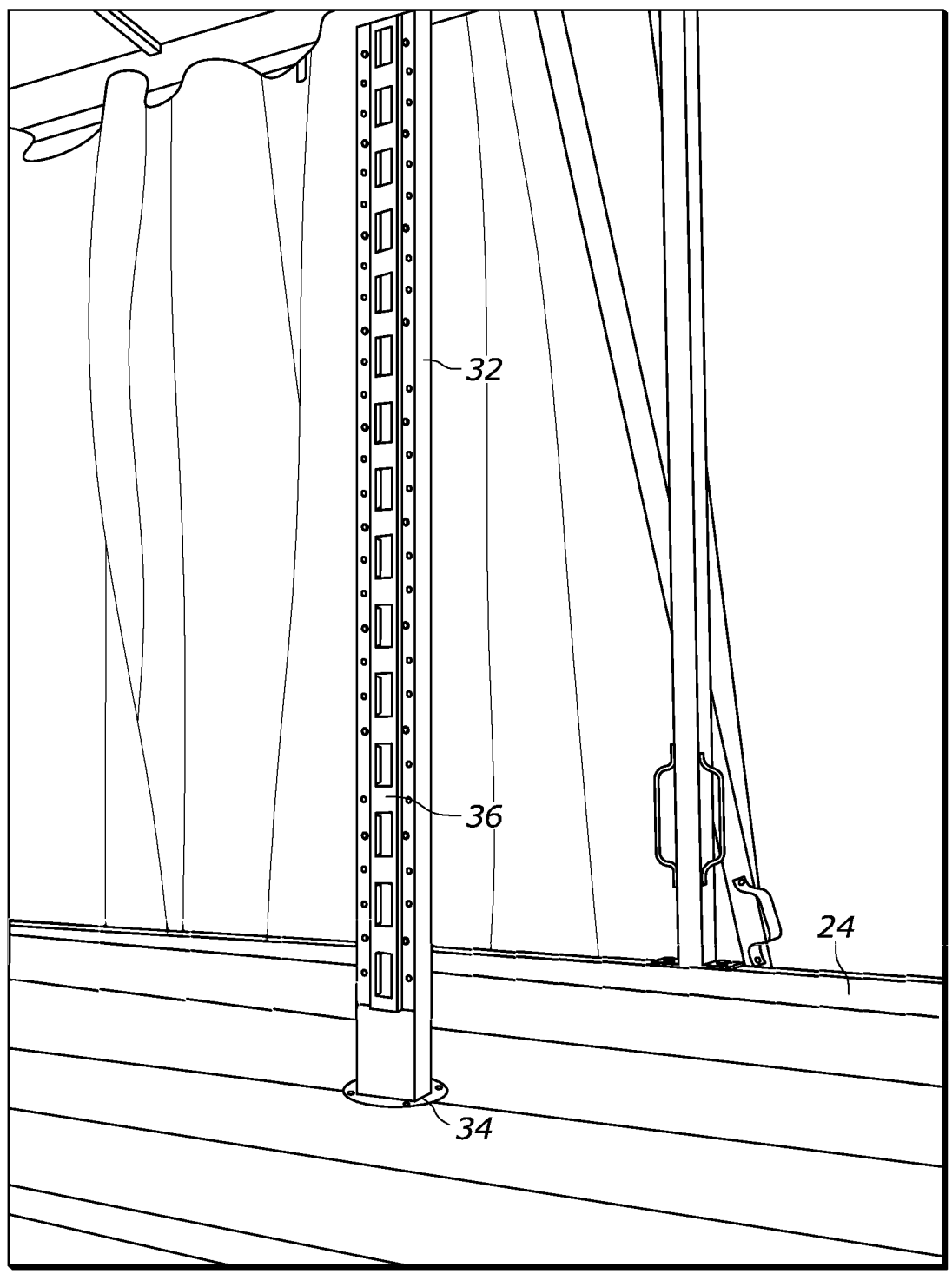
FIG. 4 is a photograph of one post and base of the example cargo securement system of FIG. 3.
Figure 5:
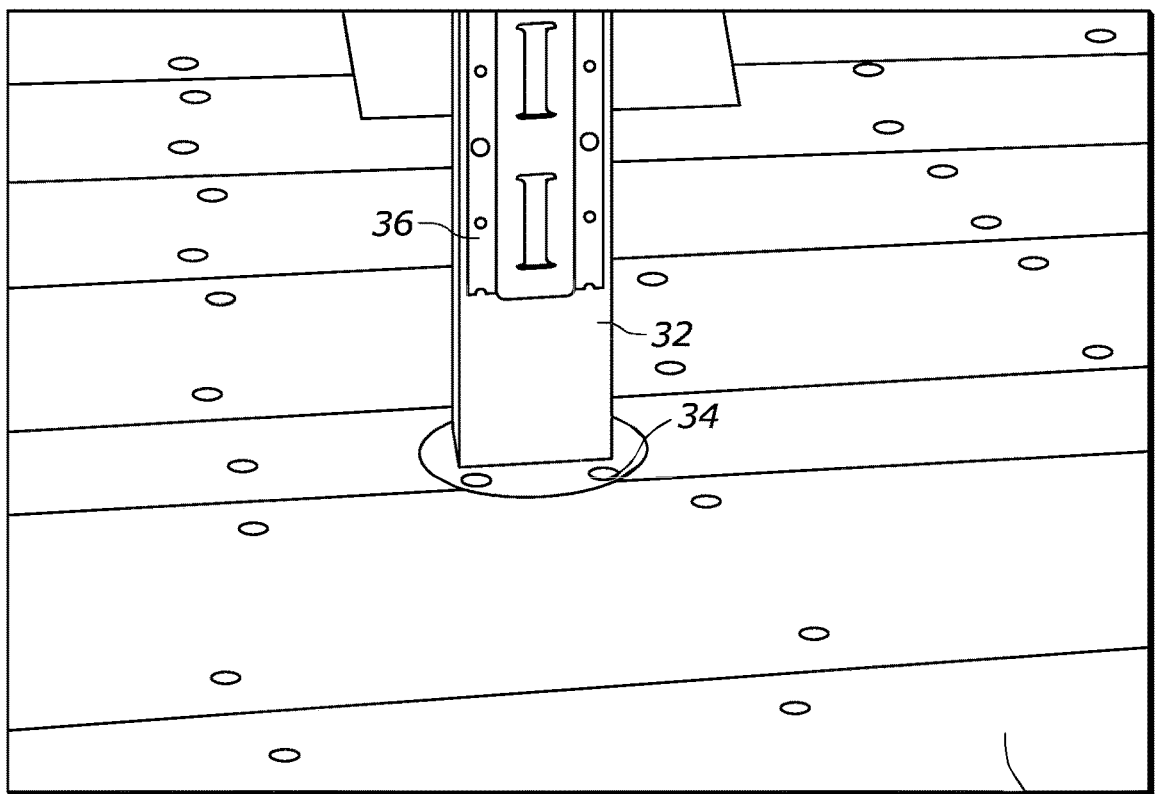
FIG. 5 is another photograph of the post and the base of FIG. 4 showing a mating joint between the post and the base.

As can be seen in FIGS. 3-4, the cargo securement system 30 can include any number of free-standing posts 32 and cooperating bases 34 that can be distributed in the cargo area 22. As can be appreciated, the cargo securement system 30 can be located in the cargo area 22 in such a manner such that a standardized pallet, shipping container or other cargo will not slide between the posts 32. In this arrangement, cargo can be secured to and/or between posts 32 and the outside edge of the cargo area 22 on either side of the cargo area 22.

Figure 6:
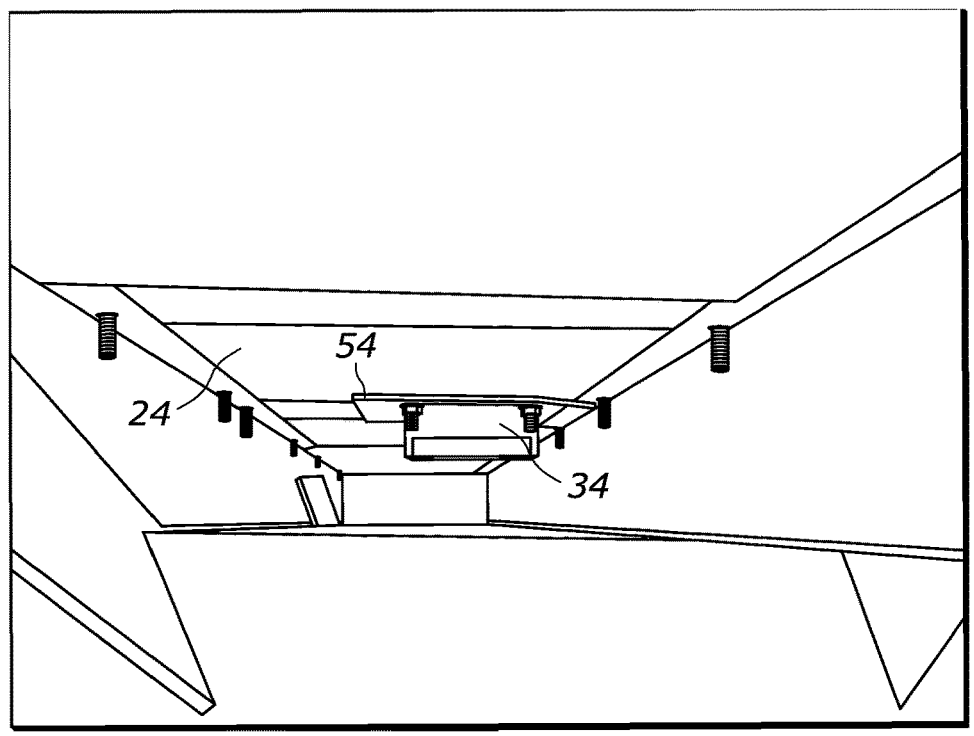
FIG. 6 is a photograph of the base of FIG. 5 showing a view from the underside of the cargo area platform to which the base is secured.
Figure 7:
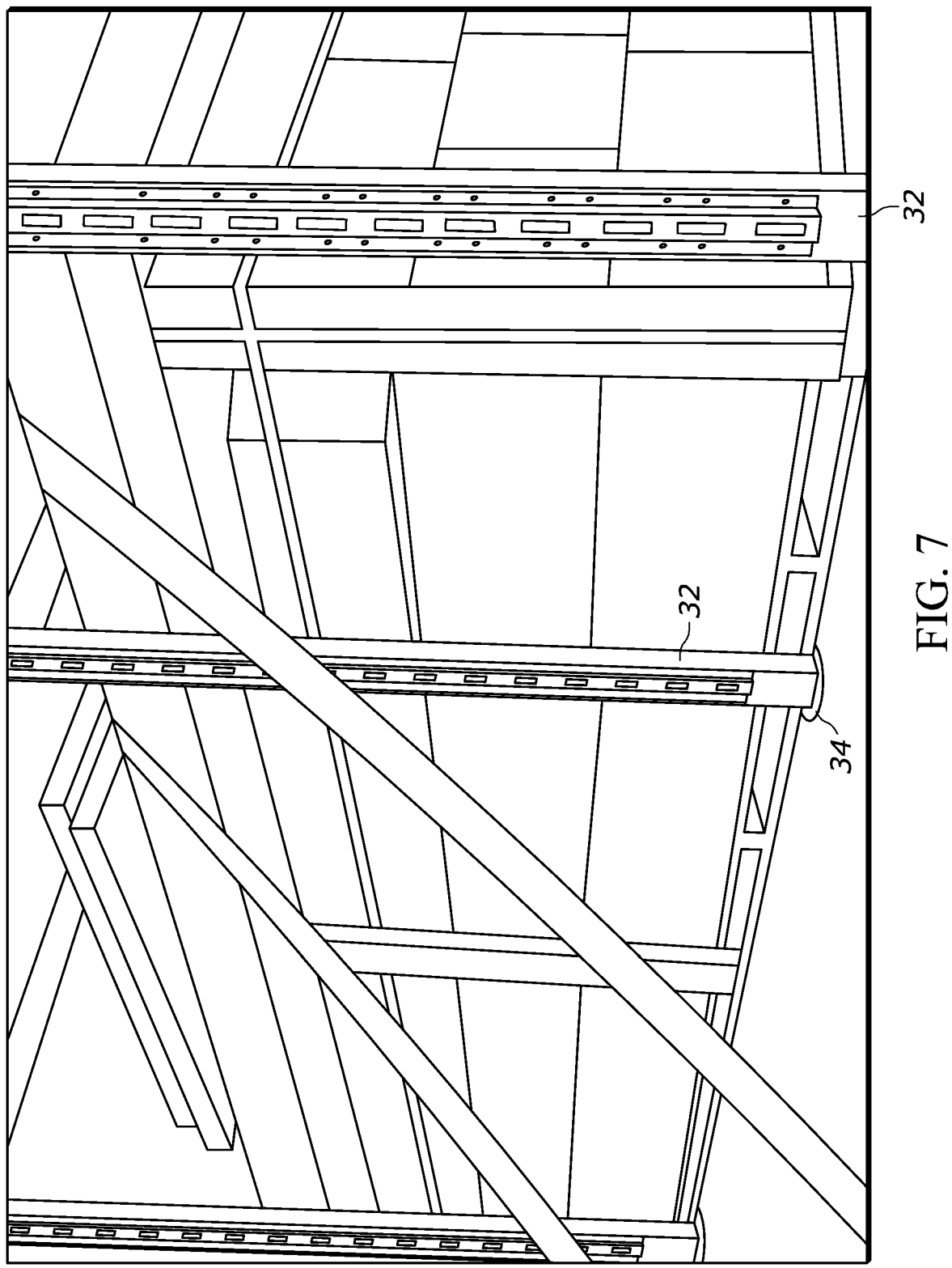
FIG. 7 is a photograph of the example cargo securement system of FIG. 2 being used to support several pallets of material in the cargo area.
Figure 8:
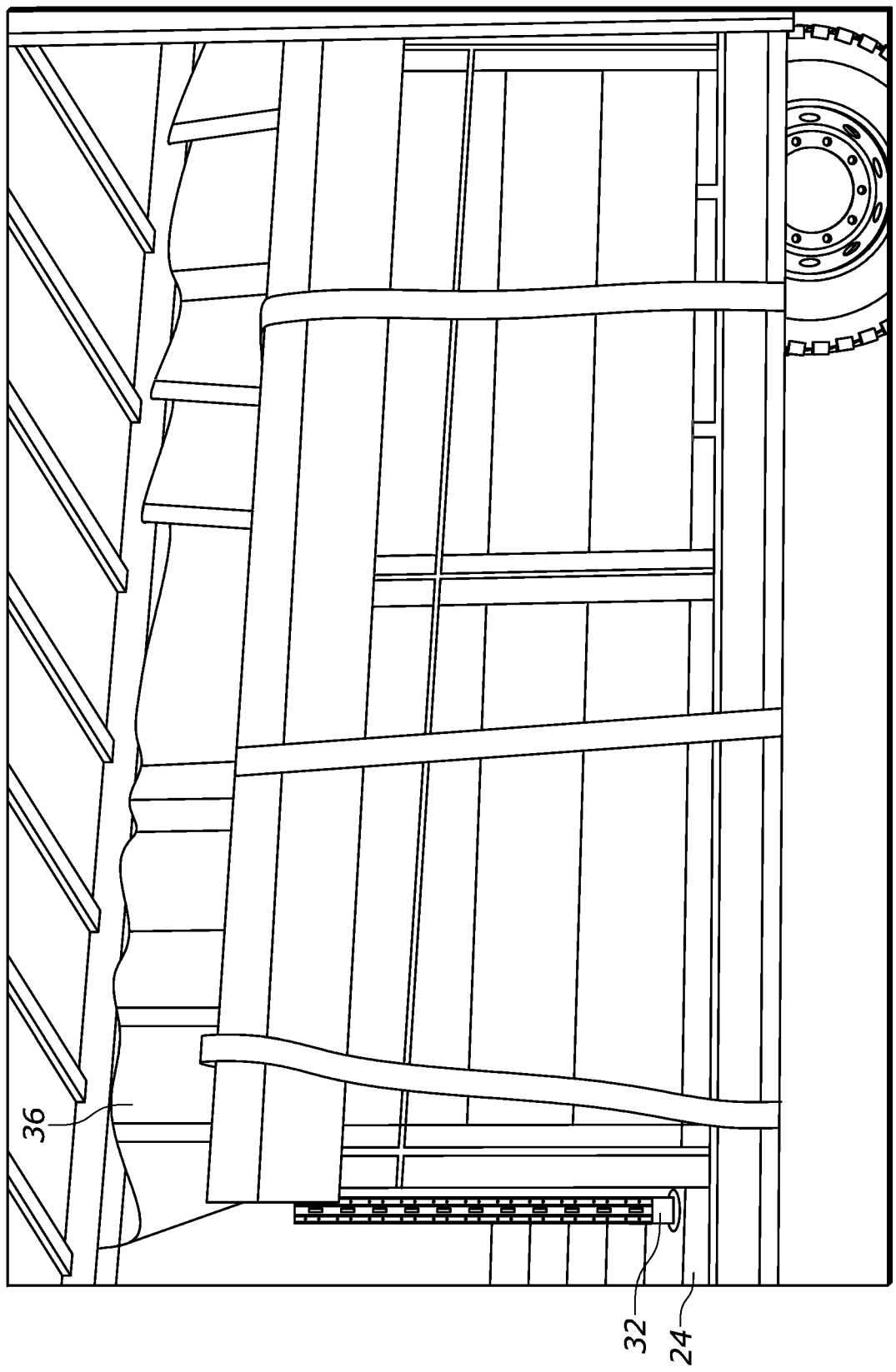
FIG. 8 is a photograph showing another view of the pallets of material of FIG. 7 being supported by the example cargo securement system.

As will be further described, the posts 32 can be inserted and removed from the bases 34. Such flexibility of the cargo securement system 30 permits the posts 32 to be installed and removed (while leaving the bases 34 in position) as needed for different size cargo. The bases 34 of the cargo securement system 30 can be secured into the platform 24 of the cargo area 22 with the top surface 35 of the bases 34 flush with the top surface 37 of the platform 24. The bases 34 can extend through respective apertures or holes 44 in the platform 24 and may be secured from the underside of the platform 24 as shown in FIG. 6.

Figure 9:
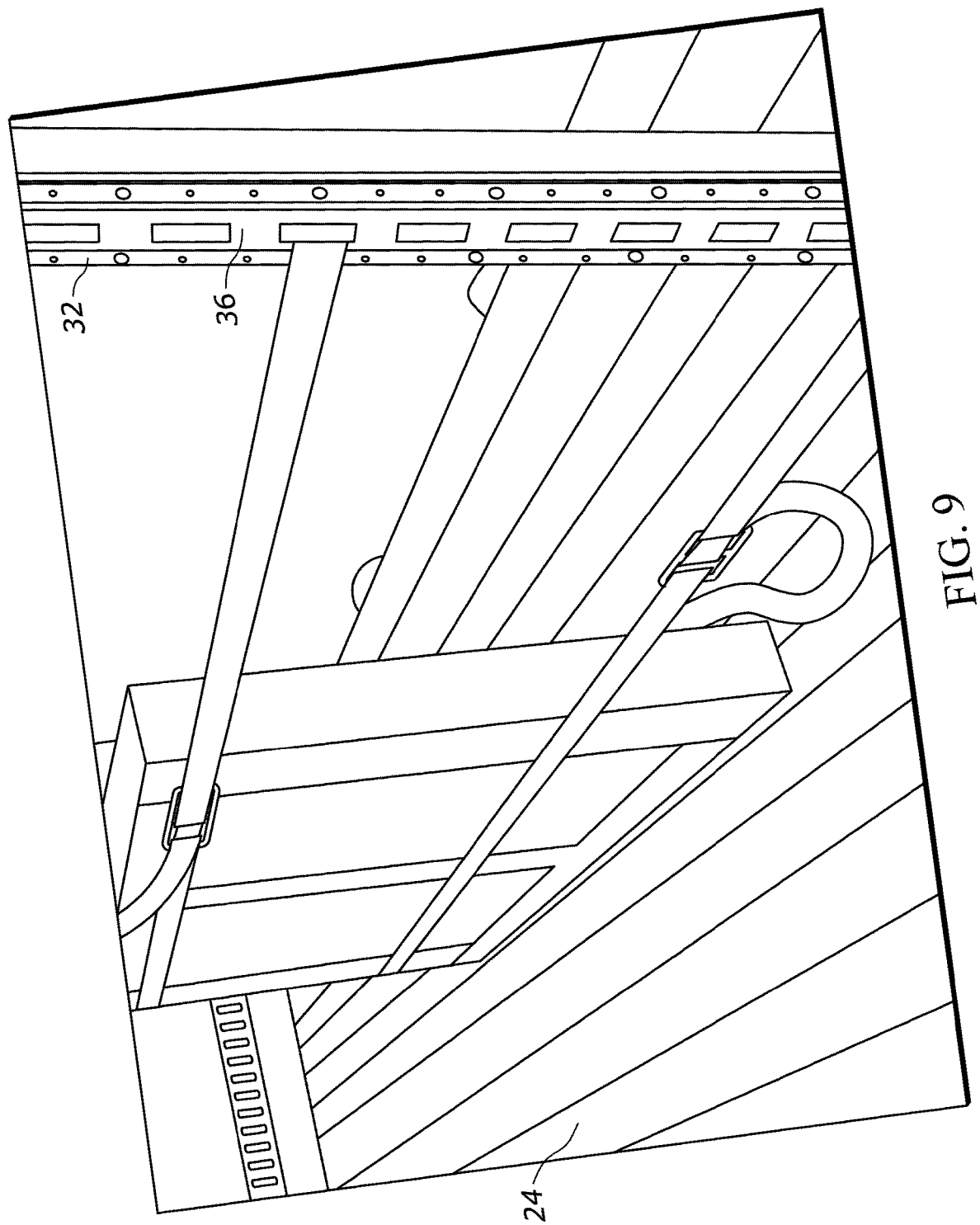
FIG. 9 is a photograph of the example cargo securement system of FIG. 2 being used to secure a packaged window in the center of the cargo area.
Figure 10:
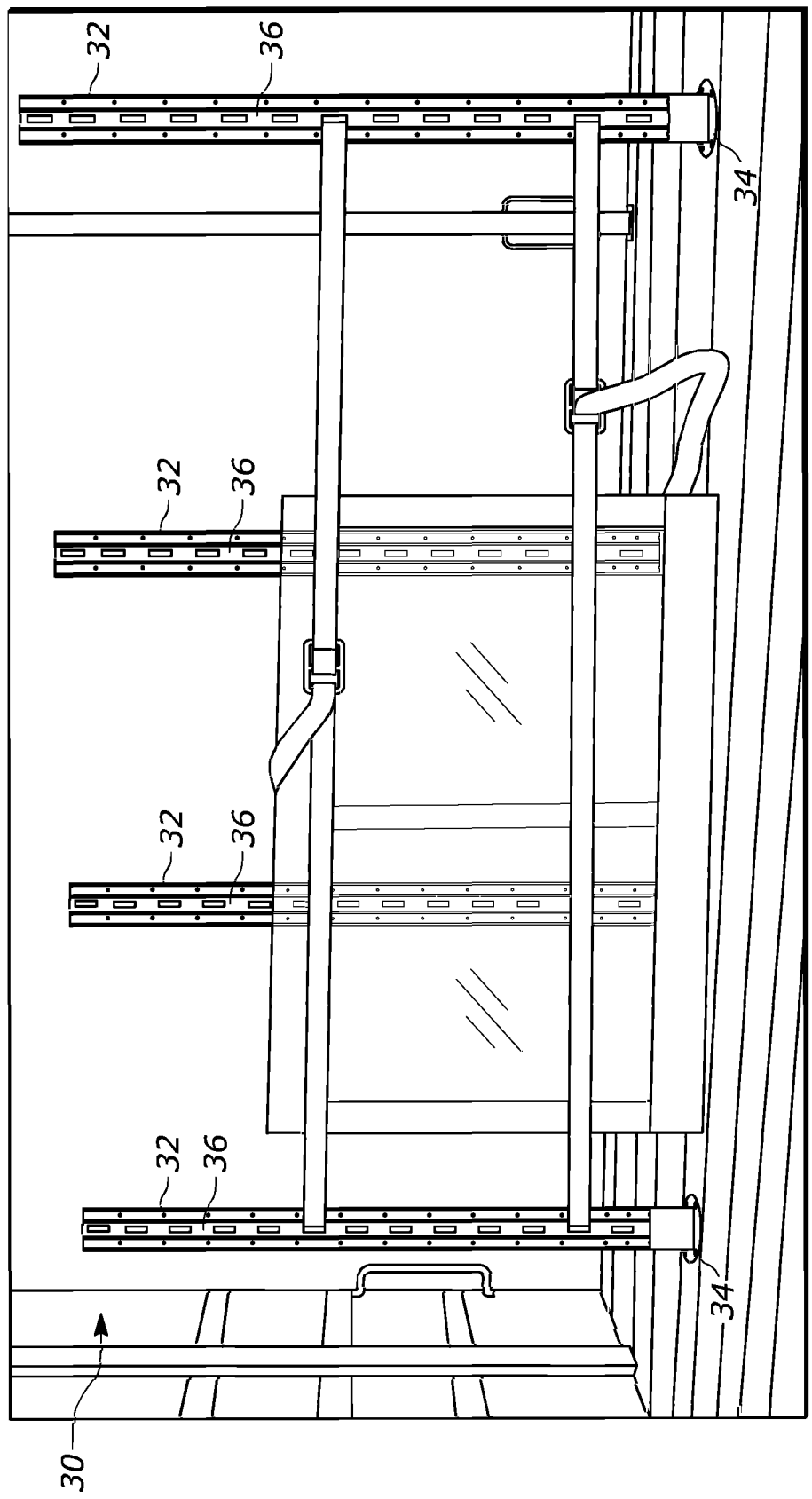
FIG. 10 is a photograph showing another view of the packaged window of FIG. 9 being supported by the example cargo securement system.

As shown in FIGS. 7-10, cargo of various sizes can be retained in position using the cargo securement system 30. As shown, large pallets can be secured between the cargo securement system 30 and the outer edge of the cargo area 22. Cargo straps can be secured over the pallets of cargo with the cargo abutting the posts 32 in the center of the cargo area. The cargo securement system 30 can also be used to retain smaller sized cargo in position. As shown in FIGS. 9-10, a smaller-sized item, such as a window, can be secured to the posts 32 using cargo straps that are attached to the retention grids 36.

Figure 11:
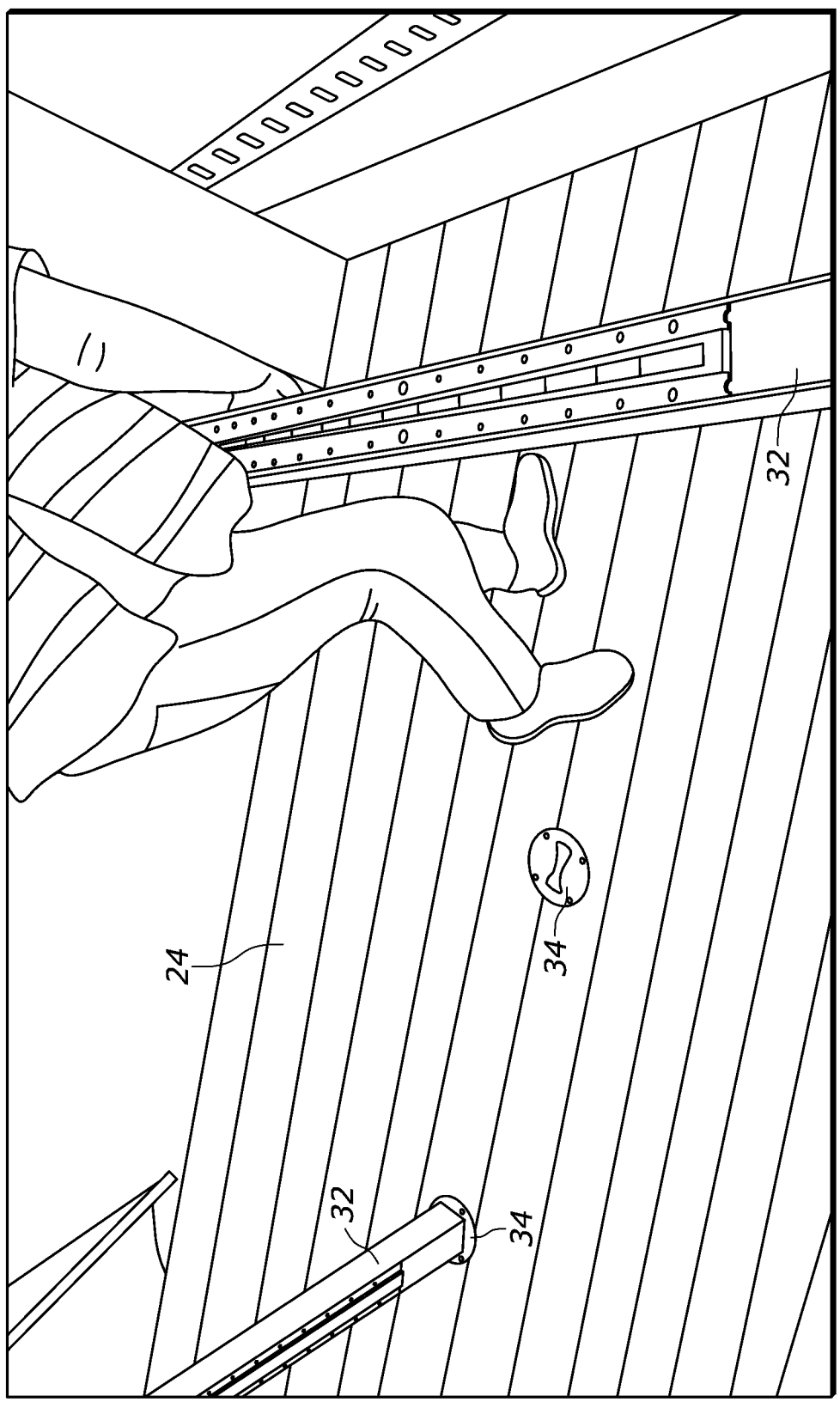
FIG. 11 is a photograph showing a user removing a post from the base of the example cargo securement system of FIG. 2.
Figure 12:
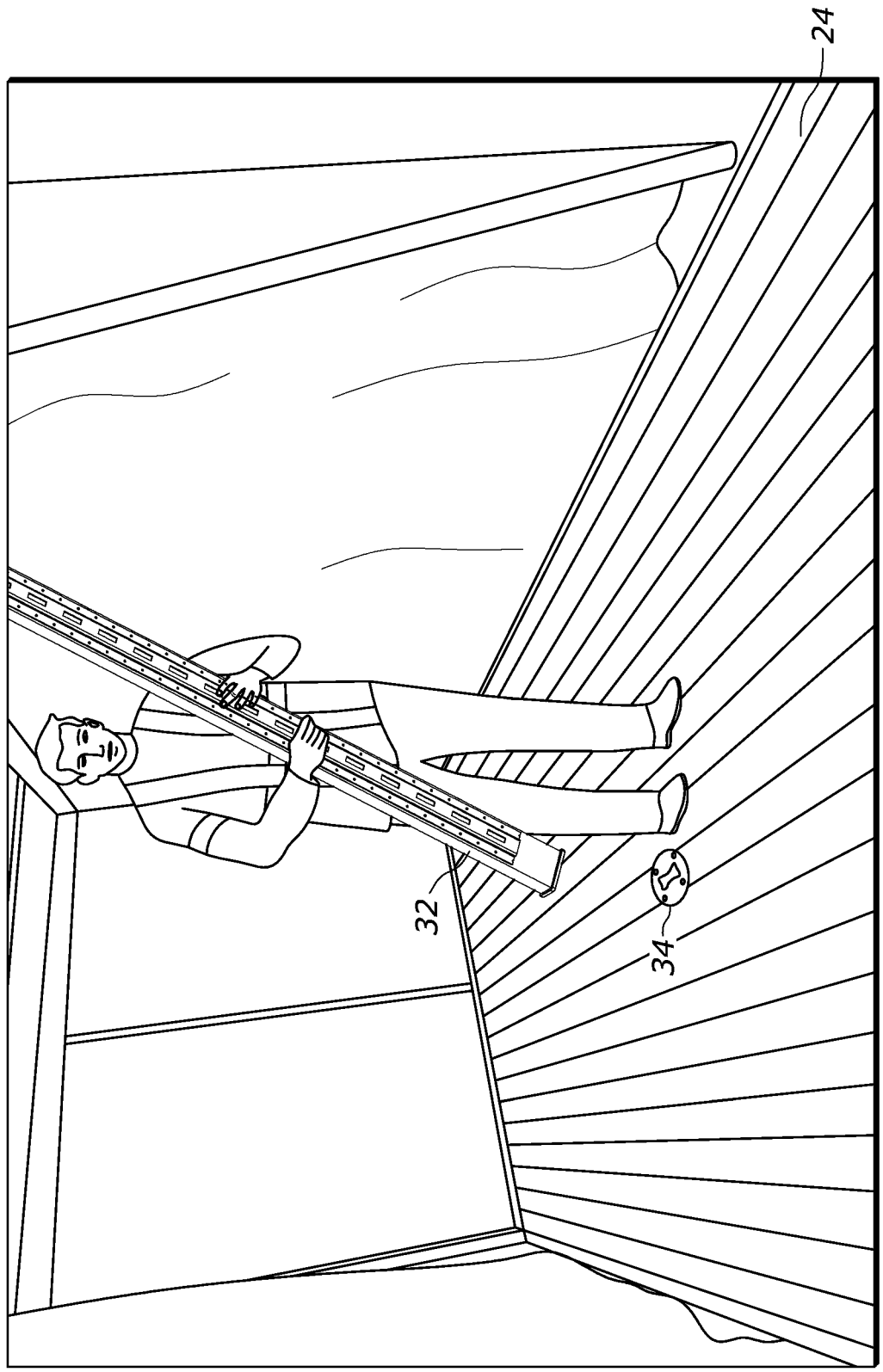
FIG. 12 is a photograph showing a user holding a post that has been removed from the base of the example cargo securement system of FIG. 2.

As previously described and as shown in FIGS. 11 and 12, each post 32 can be easily removed from the bases 34. The posts 32 are sized and configured to enable a single user to remove the posts 32 from the bases 34. In this manner, the cargo securement system 30 enables the cargo area 22 to be reconfigured according to the needs of the user. Since the posts 32 are simply inserted into the bases during installation, the posts 32 can be installed or removed by a single user without the need for tools. In one example, each post 32 weighs less than 25 pounds. In other examples, the posts 32 weight less than 15 pounds.

Figure 13:
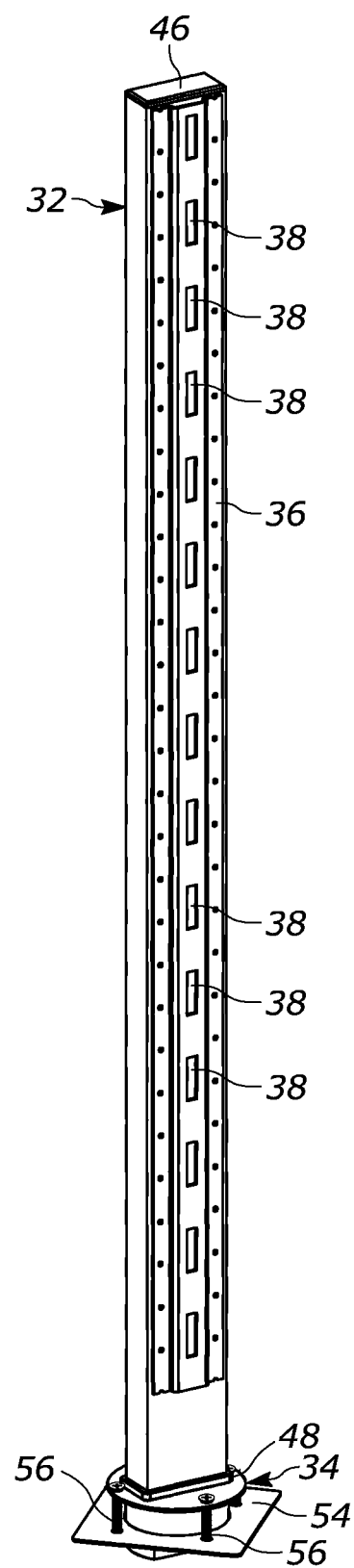
FIG. 13 is a perspective view of an example cargo securement system of the present disclosure.

Referring now to FIG. 13, one post 32 and base 34 are shown as assembled without the platform 24 of the cargo area 22. As can be seen, the post 32 includes a cap 46, the retention grid 36 and a footing 48. The footing 48, as shown, is fixed to the post 32 and is a female fitting connected to the end of the post 32 that is inserted into the base 34 to support the post 32. The cap 46 is installed in an end of the post 32 opposite the footing 48. The retention grid 36 is connected to an exterior surface of the post 32 between the cap 46 and the footing 48. A second retention grid 36 can be connected to the post 32 so that a retention grid 36 is positioned on each side of the post 32.

Figure 14:
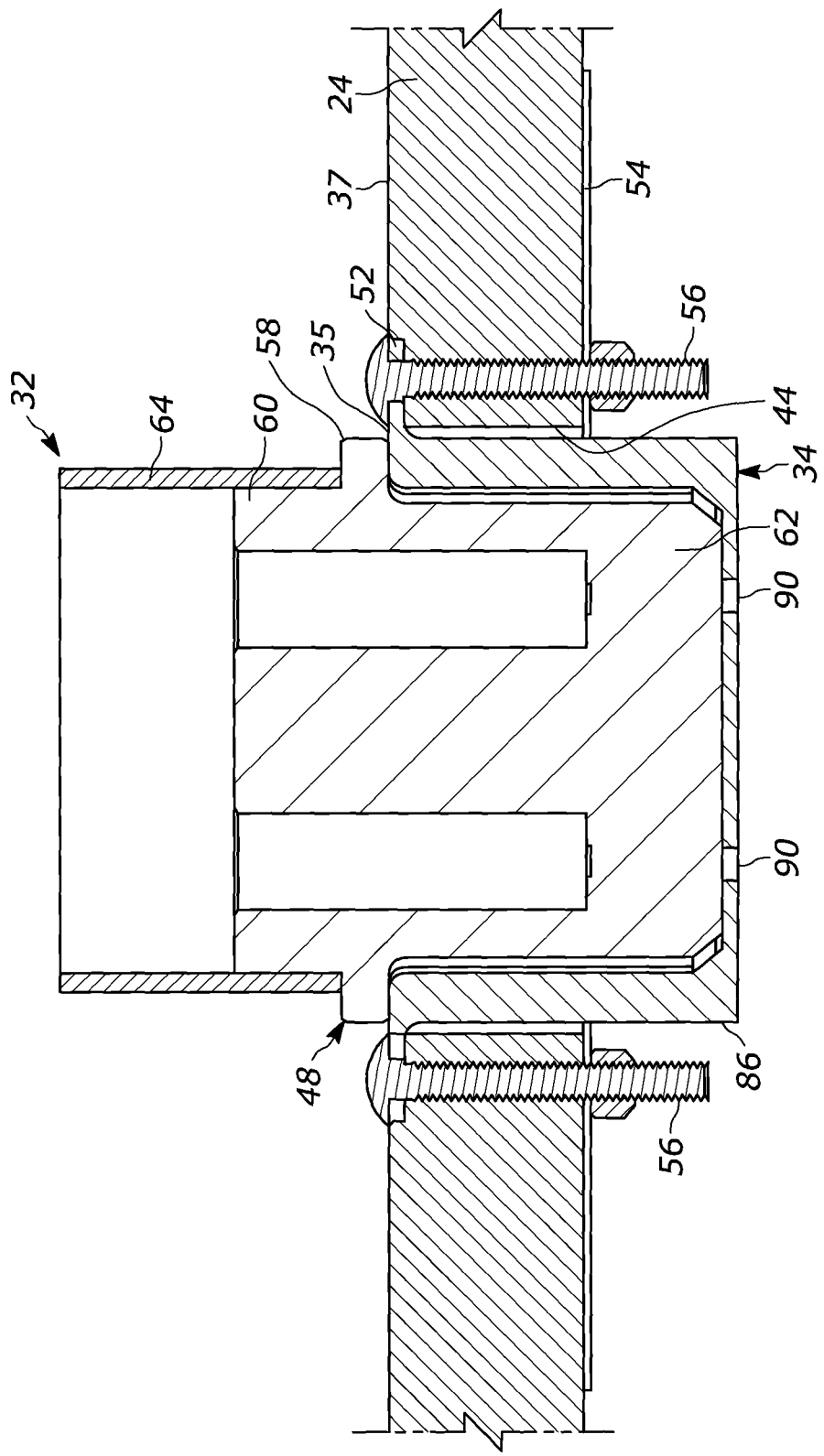
FIG. 14 is a sectional view of a lower portion of the example cargo securement system of FIG. 13 showing the system secured to a cargo area platform.

As shown in FIG. 14, the post 32 and base 34 assembly can be fixed into the platform 24 of a cargo area 22. The base 34 can be inserted into a respective hole 44 in the platform 24. After the base 34 is inserted into the platform 24, the base 34 is secured in position by clamping the platform 24 between a flange 52 of the base 34 and a plate 54 using one or more bolts 56. In other examples, the base 34 can be secured to the platform 24 using other configurations or in other ways. For example, the plate 54 may not be used in some instances. In other examples, other types of fasteners or connection methods can be used. Screws, rivets, adhesive, welding, staking or the like can be used secure the base 34 in the cargo area 22.

As further shown in FIG. 14, the footing 48 can include a support ledge 58, a neck portion 60 and an anchor portion 62. The support ledge 58 is a portion of the footing 48 that separates the neck portion 60 from the anchor portion 62 and can be sized such that it abuts the post 32 and the base 34 when the post 32 is inserted into the base 34.

Figure 15:
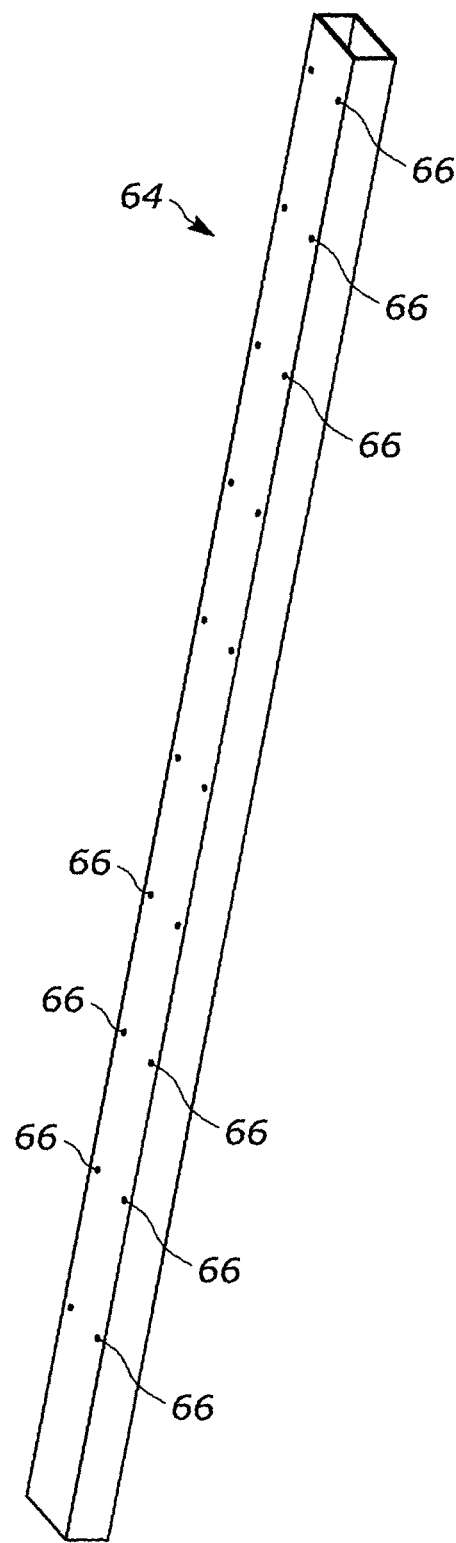
FIG. 15 is a perspective view of a post of the example cargo securement system of FIG. 13.

As shown in FIG. 15, the post 32 includes a column member 64. The column member is the main support member of the post 32. The column member 64 can have various shapes and configurations. In this example, the column member 64 is a rectangular tube with a cross-section measuring 4 inches by 2 inches. The column member 64 can be of any suitable length and material and in the example shown is at least 48 inches tall and is made of an aluminum material. In other examples, the column member 64 can have a different length or cross-sectional shape/size. In addition, the column member 64 can be made of other materials such as other metals, plastics, or composites.

Figure 16:
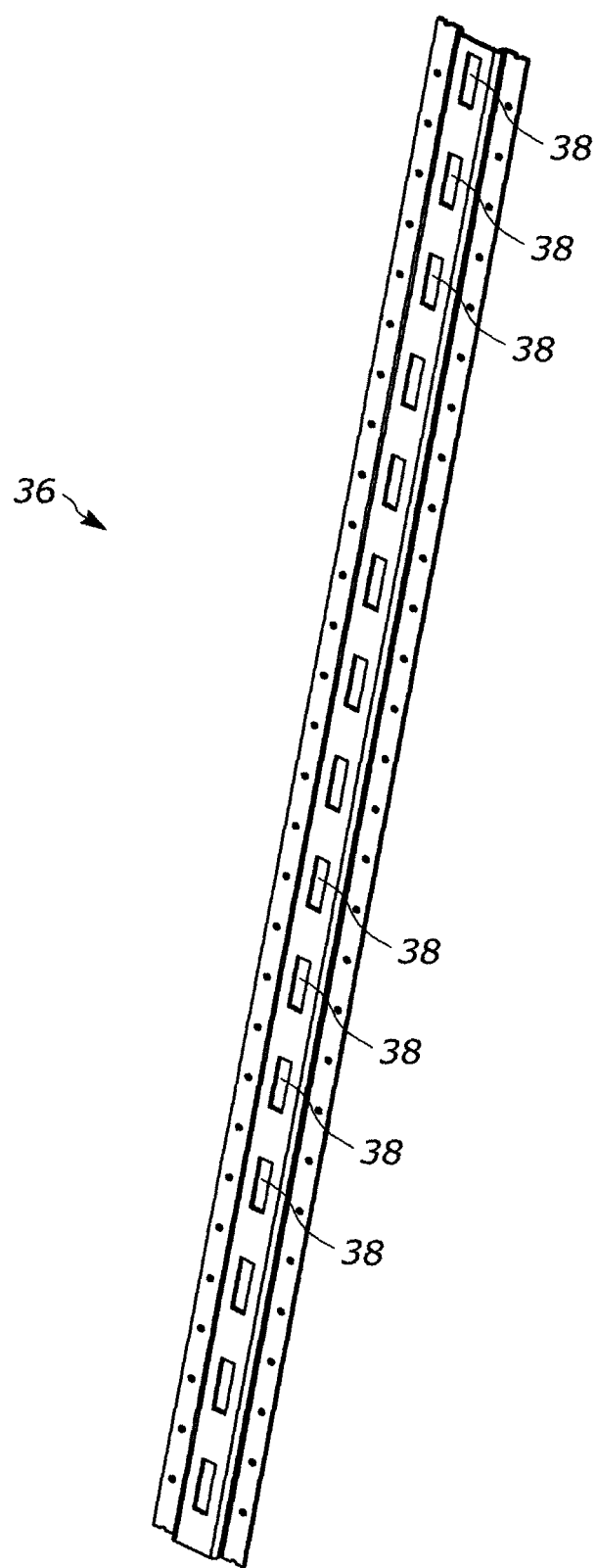
FIG. 16 is a perspective view of an example retention grid that can be secured to the post of the cargo securement system of FIG. 13.

As shown the column member 64, in this example, includes a series of connector holes 66. The connector holes 66 can be used to connect the retention grid 36 to the column member 64. As shown in FIG. 16, the retention grid can have a shape that includes a series of attachment points 38. As previously discussed, various retention straps, hooks, ropes or the like can be connected to the attachment points to secure cargo to the post 32. In one example, the retention grid 36 is connected to the column member 64 using rivets. Other fasteners or connection methods can also be used.

Figure 17:
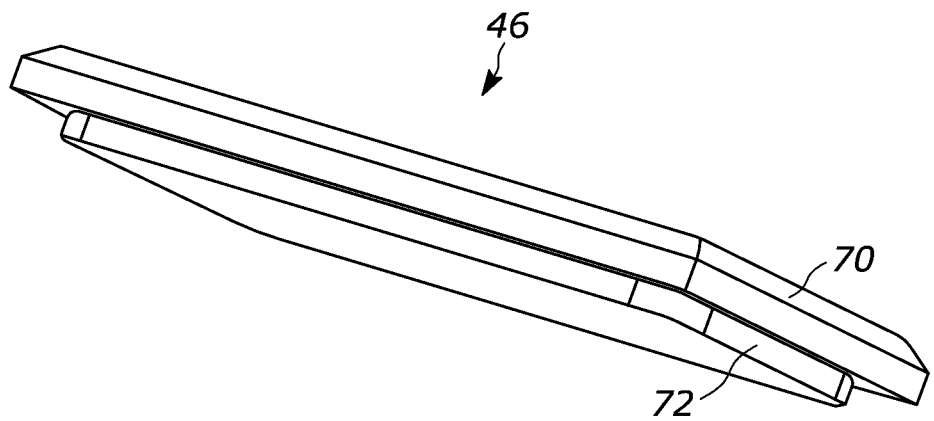
FIG. 17 is a perspective view of an example cap that can be installed in the post of the cargo securement system of FIG. 13.
Figure 18:
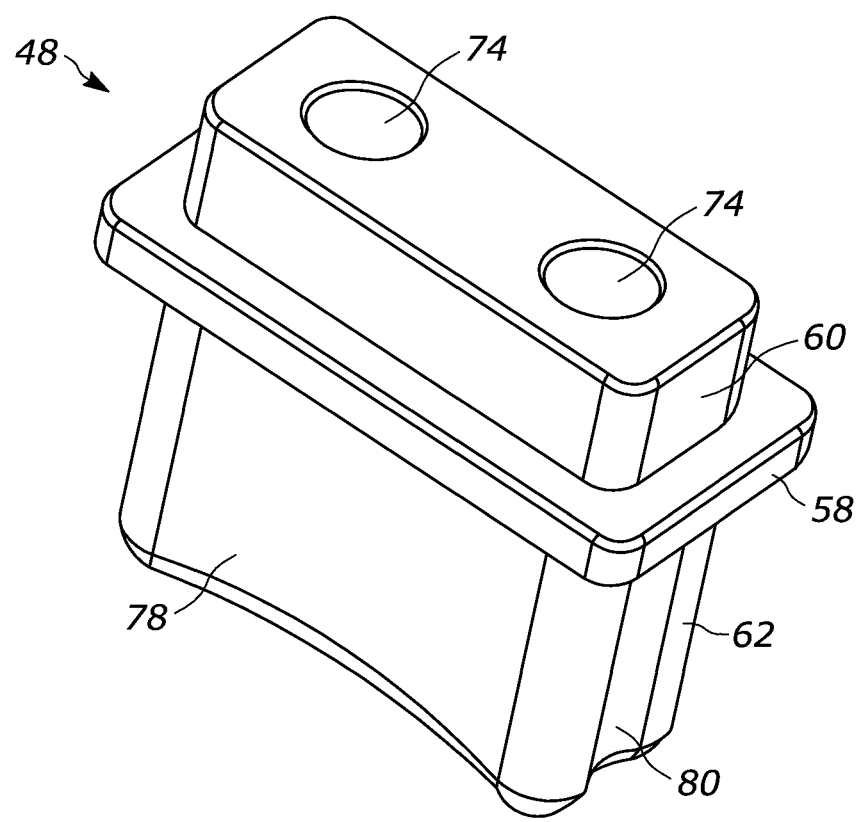
FIG. 18 is a perspective view of an example footing of the post of the cargo securement system of FIG. 13.
Figure 19:
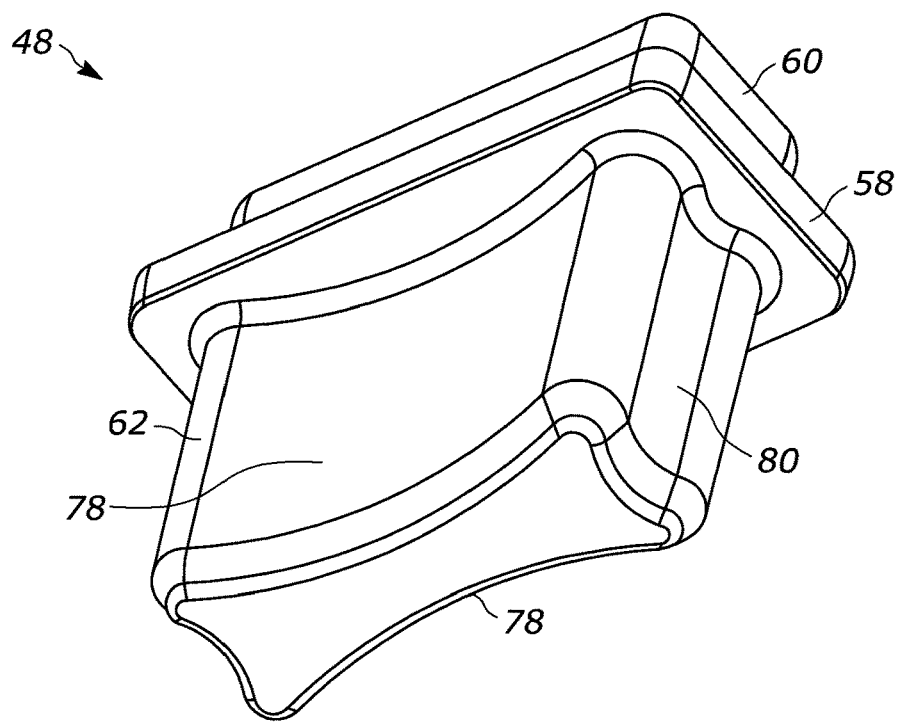
FIG. 19 is another perspective view of the example footing of FIG. 18 showing the dog-bone shaped anchor portion.
Figure 20:
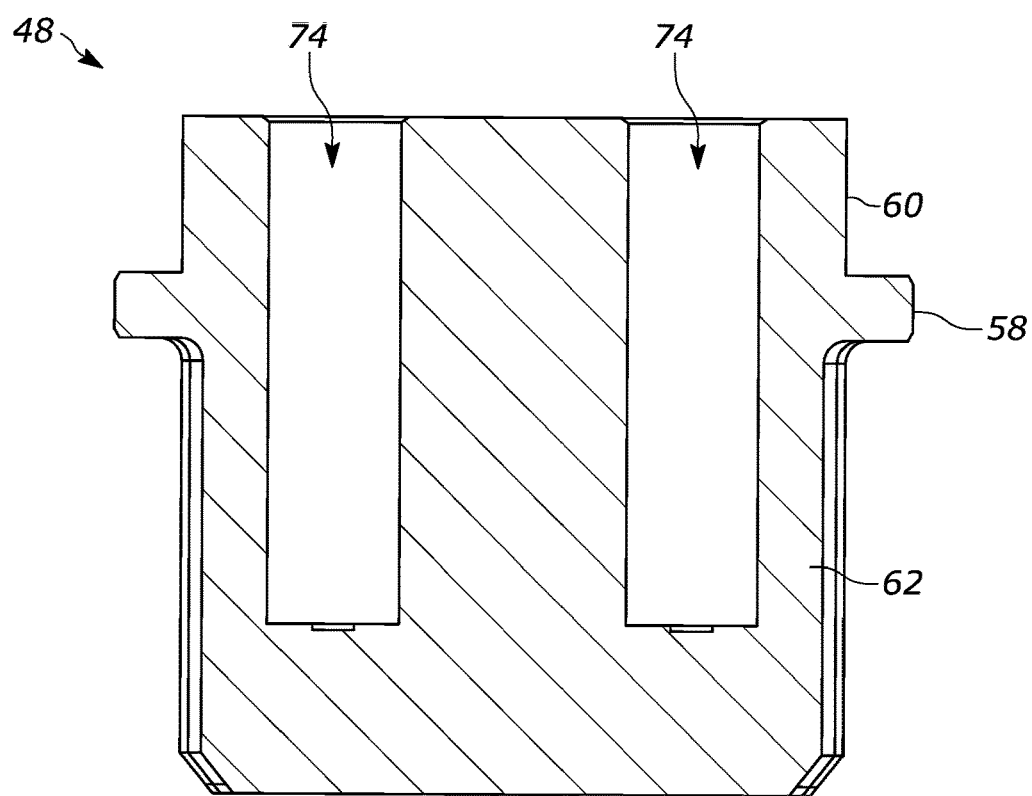
FIG. 20 is a sectional side view of the footing of FIG. 18.

Referring now to FIG. 17, the cap 46 of the post 32 is shown. The cap 46 can include a cover portion 70 that covers a second (or distal) end of the cap located on an end of the post 32 opposite to the footing 48. The cap 46 can also include a lip portion 72 that fits inside the hollow section of the column member 64. The cap 46 can prevent water, debris or other contaminants from entering the post 32. The cap 46 can also protect users from contacting the end of the column member 64.

FIGS. 18-21 show an example footing 48 of the post 32. The footing 48 can include the neck portion 60, the support ledge 58 and the anchor portion 62. As previously discussed, the neck portion 60 can fit inside the column member 64. In this manner, the column member 64 fits over the neck portion 60 and rests on the support ledge 58. The column member 64 is connected to the footing by welding, adhesive, fasteners or other suitable attachment. The neck portion 60 can include two bore holes 74 that extend longitudinally into the footing 48. The bore holes 74 can extend completely through the footing 48 or can extend partially into the footing 48. The bore holes 74 reduce the weight of the footing 48 and/or can be used to permit water or other materials that may enter the post 32 to flow out of the post 32.

In the example shown, the footing 48 is machined from aluminum and then welded to the column member 64. In other examples, the footing can be cast or otherwise formed out of other metals, plastics or composite materials.

As further shown, the footing 48 also includes the anchor portion 62. The anchor portion 62 is positioned opposite to the neck portion 60. The anchor portion 62 is a female portion of the footing that fits inside a slot 76 of the base 34 to support the post 32 in position. As such, the anchor portion 62 has a shape that cooperates with the shape of the slot 76. In the example shown, the anchor portion 62 has a dog bone shape. The lateral sides of the anchor portion 62 are formed from arcuate shaped anchor walls 78. The two end wall 80 also are arcuate in shape.

Figure 21:
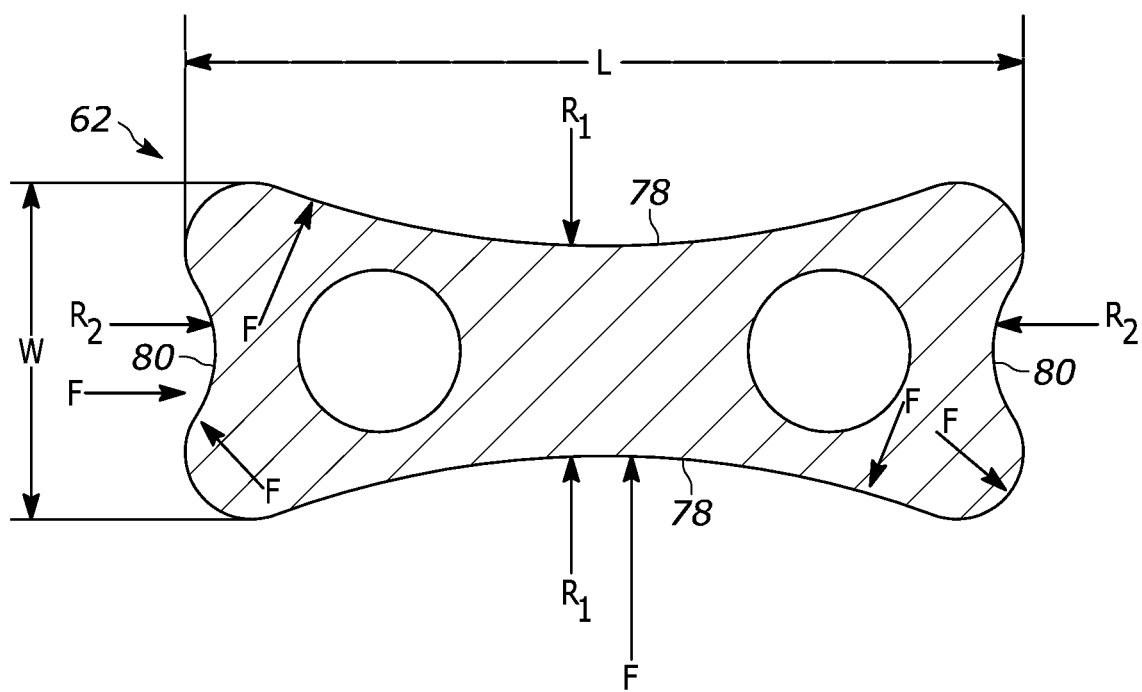
FIG. 21 is sectional top view of the anchor portion of the footing of FIG. 18.
Figure 22:
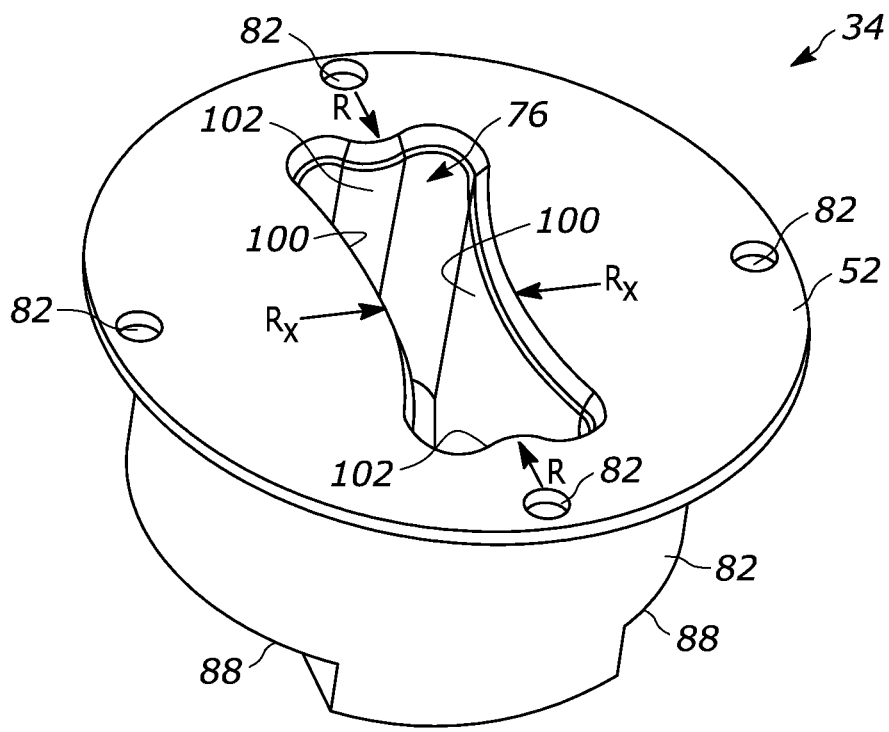
FIG. 22 is a perspective view of an example base of the cargo securement system of FIG. 13.
Figure 23:
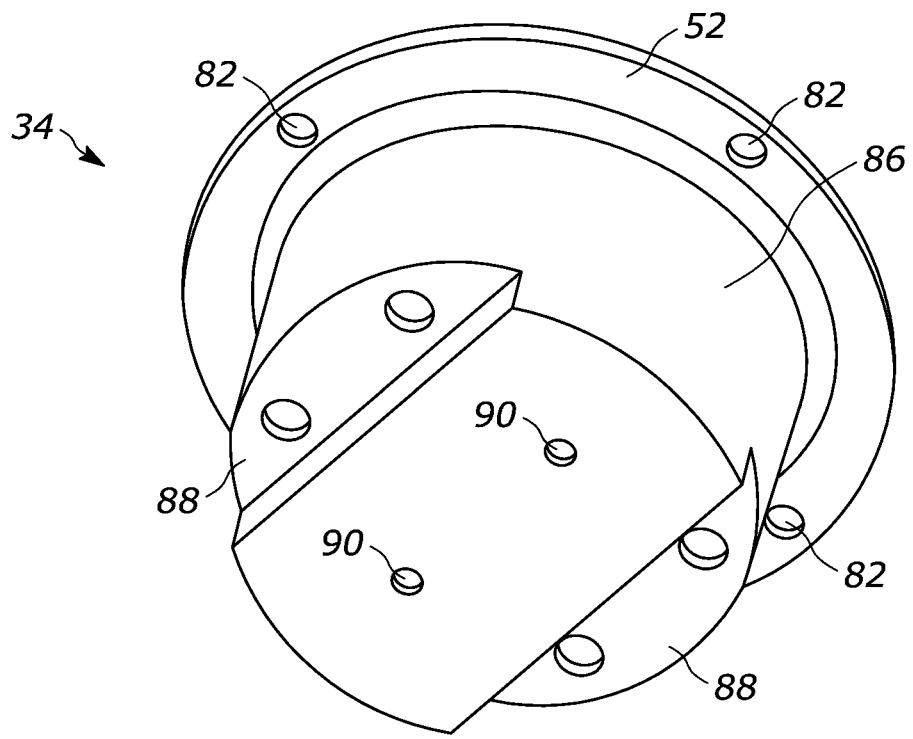
FIG. 23 is another perspective view of the base of FIG. 22 showing the lower portion thereof.
Figure 24:
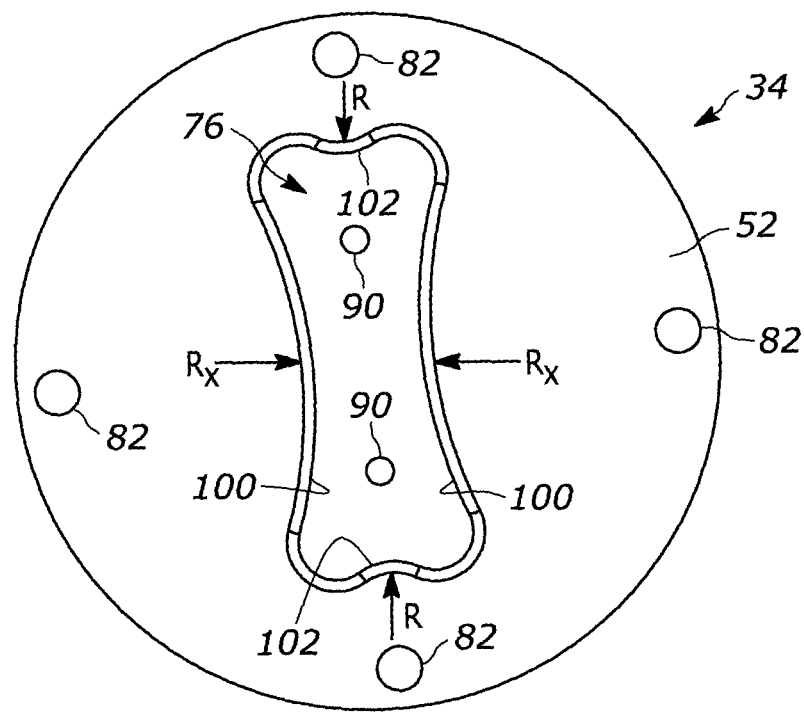
FIG. 24 is a top view of the base of FIG. 22.
Figure 25:
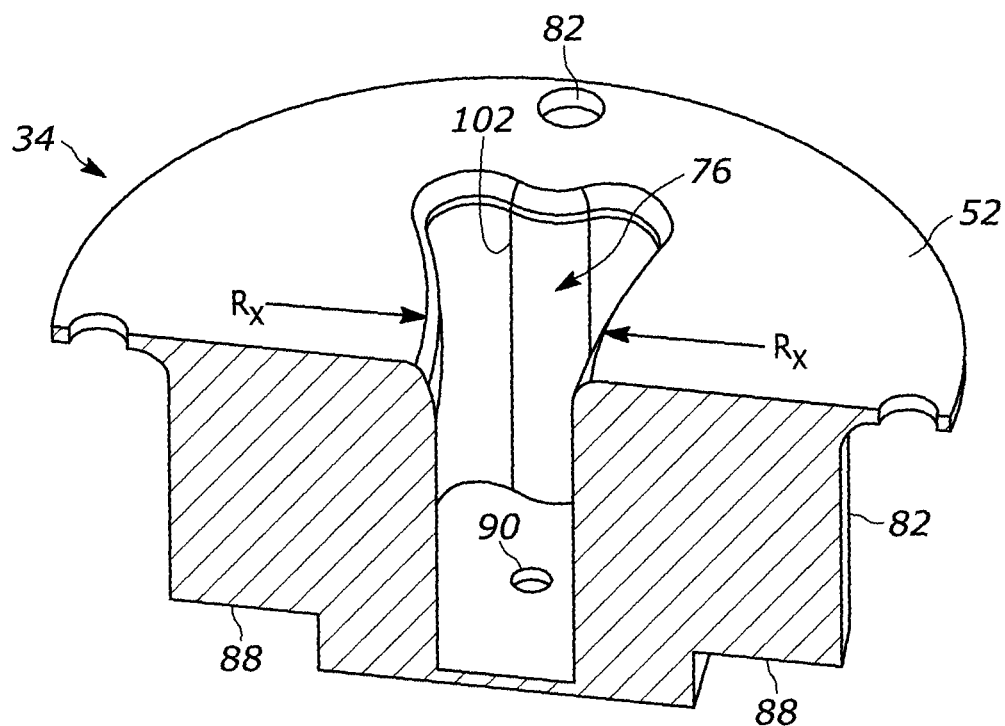
FIG. 25 is perspective sectional view of the base of FIG. 22.

As shown in FIG. 21, the anchor walls 78 and the end walls 80 can have concave shapes. The anchor portion 62 can be sized such that an overall length L is at least twice the overall width W. In other examples, the anchor portion 62 can have other suitably shaped walls to support the post 32 in the base 34 and/or can different relative sizing of the width W and the length L. The length L of the anchor portion 62 is smaller than a length of the column member 64 of the post 32. The anchor walls 78 may have a radius $R_1$ and the end walls 80 may have a radius $R_2$. The radius $R_1$ of the anchor walls 78 is greater than the radius $R_2$ of the end walls 80 (i.e., $R_1 > R_2$).

FIGS. 22-25 show an example base 34. As can be appreciated, the base 34 can be sized so as to fit in existing platforms 24 of cargo areas 22. Traditional attachment points in cargo areas 22 can include D-ring (or bull-ring) attachment points. Such traditional attachment points are often circular in shape and are inset into the platform 24 of cargo areas 22. The base 34 can be sized to fit inside the holes that may be pre-existing in a platform 24 when the traditional attachment points (e.g., D-rings, bull-rings) are removed.

The bases 34 can be positioned in the cargo area 22 in any desired pattern. In the example shown (FIGS. 2 and 3), a series of bases 34 are arranged in a line down the center of the cargo area 22. In other examples, rows of bases 34 can be positioned in a transverse orientation across the cargo area 22 or multiple longitudinal rows of the bases 34 can be used. The flexibility of the cargo securement system 30 permits the user to install the cargo securement system 30 into the cargo as needed or desired. The user can then insert the posts 32 into the bases 34 as desired to customize the cargo securement system 30 according the specialized needs of the shipment that needs to be transported.

The base 34 includes connection holes 82 that can be used, as previously described (see FIG. 14), to secure the base 34 to the platform 24 of the cargo area 22. The base 34 can also include the slot 76. As shown, the slot 76 has a dog-bone shape similar to that of the anchor portion 62 of the footing 48.

The slot 76 defines walls 100 and walls 102. Each wall 100 has a radius $R_x$ and each wall 102 has a radius R. The walls 100 correspond to walls 78 of the anchor portion 62 and walls 102 correspond to walls 80 of the anchor portion 62. The radius $R_x$ of the walls 100 is greater than the radius R of the walls 102 (i.e., $R_x > R$).

As discussed, the anchor portion 62 is received into the slot 76. In this way, the post 32 and the base 34 are in close contact/engagement along the walls 78 of the anchor portion 62 and the walls 100 of the slot 76, and along the walls 80 of the anchor portion 62 and the walls 102 of the slot 76, thereby retaining the anchor portion 62 of the post 32 in the slot 76 of the base 34 when forces F (e.g., torque or twisting forces) act on the post 32 (i.e., forces F may act on the post 32 at multiple curves in the walls 78, 80 thereby facilitating retention of the post 32 within the slot 76).

The relative sizes of the anchor portion 62 and the slot 76 permit the post 32 to be easily inserted into the base 34 and to be easily removed from base 34. The arcuate shape of the slot 76 and the anchor portion 62 increases the surface area between the two mating members over that of traditional rectangular, circular and oval shapes. The increased surface area causes the post 32 to be secured in the base 34 when the post 32 is loaded in a direction that is not aligned with the vertical direction. This configuration of the cargo securement system 30 permits cargo to be sufficiently retained in position with minimal loading.

As further shown in FIGS. 22-25, the base 34 can include a lower portion 86 positioned below the flange 52. The lower portion, in this example, is cylindrical in shape and includes two flat portions 88. The flat portion 88, as will be further described, can be used to secure the base 34 to the platform 24 in some environments. The base 34 can also include one or more drain holes 90. The drain holes 90 are positioned in the slot 76 to permit water or other contaminants to drain out of the base 34.

The base 34 can be made of materials similar to the footing 48. In the example shown, the base 34 is machined from a steel or aluminum material. In other examples, a suitable metal, plastic or composite material could also be used. Further, the base 34 can be produced according to various manufacturing processes, including casting and molding.

Figure 26:
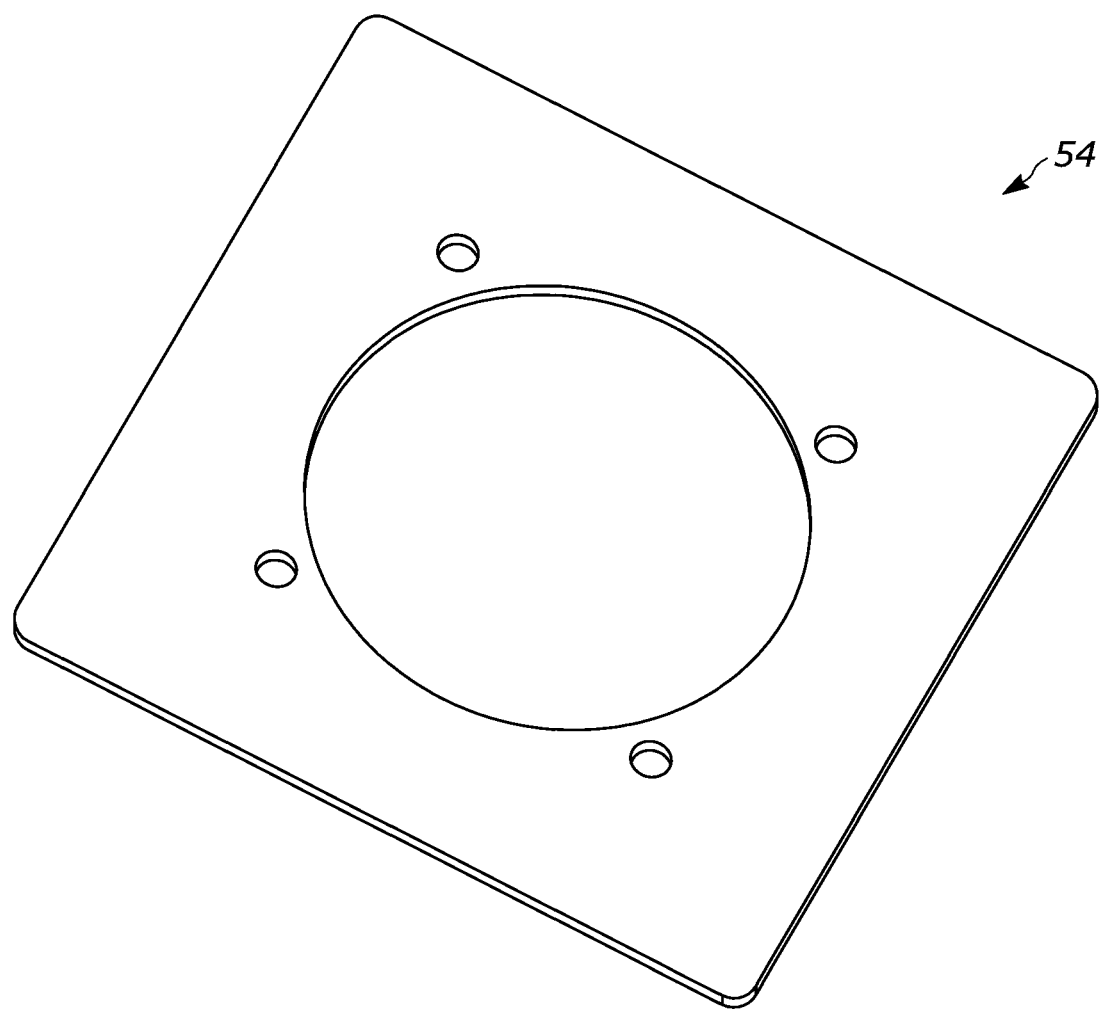
FIG. 26 is a perspective view of an example plate of the cargo securement system of FIG. 13.
Figure 27:
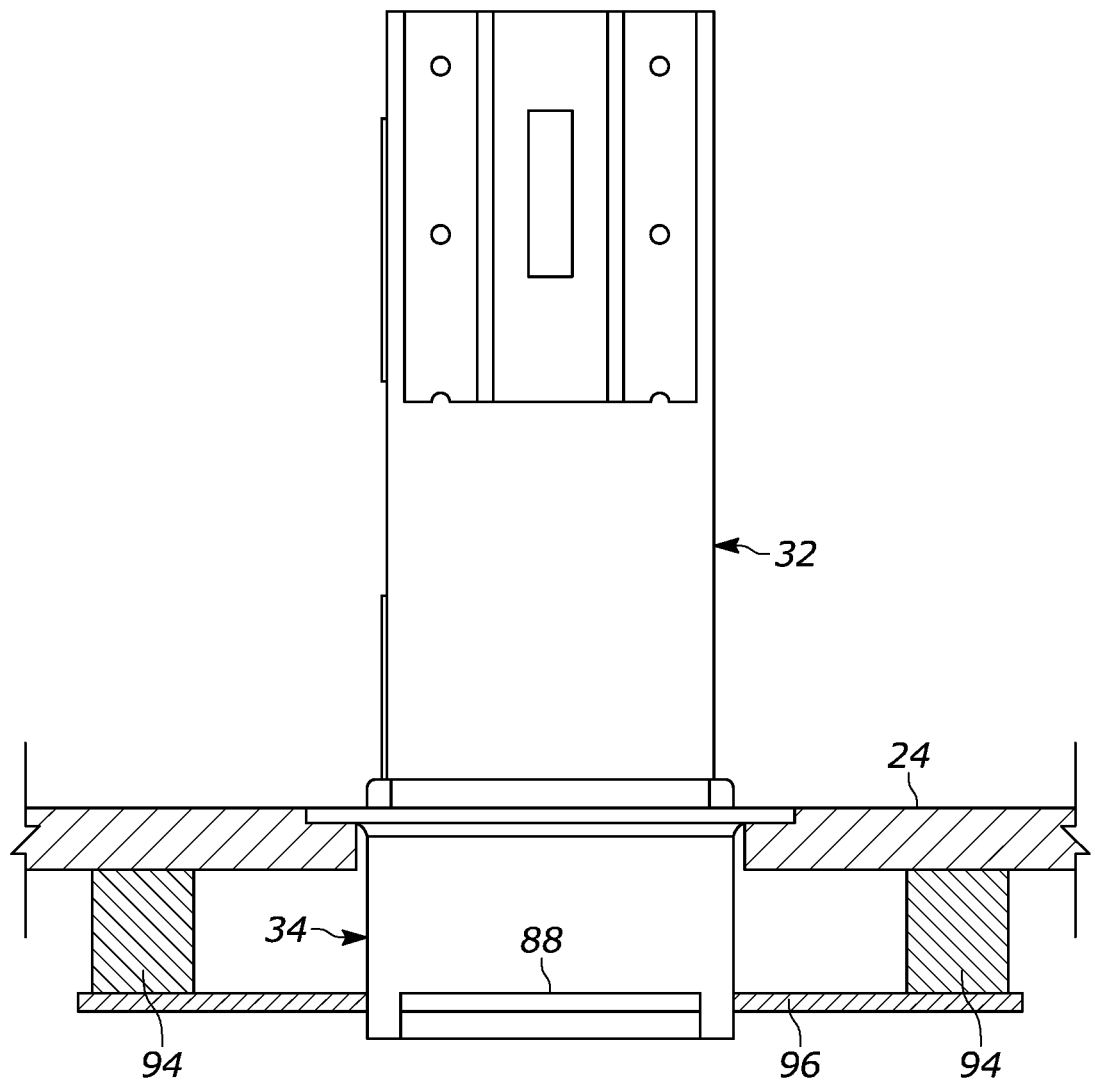
FIG. 27 is a side view of the cargo retention system of FIG. 13 showing an alternate attachment arrangement that includes a cross-brace.

FIG. 26 shows an example plate 54. The plate 54 is sized and configured to fit over the base 34 and to secure the base

34 in a desired position. The plate 54 can be used to distribute the load from the base 34 over a larger surface area on the platform 24. The plate 54 can be made of any suitable metal, plastic, or composite material.

In an alternate example, the base 34 is connected to the platform 24 in an alternate configuration from that previously described. In this example the platform 24 is supported by one or more cross-members 94. The base 34 can be positioned between two adjacent cross-members 94. A cross-brace 96 can be used to span between the cross-members 94 and to attach to the flat portions 88 of the base 34. In this manner, the base 34 can be secured to the cross-members 94 in addition to, or instead of, securing the base 34 to the platform 24.

As previously described, the cargo securement system 30 provides a flexible system that can be used in a variety of cargo areas to retain cargo in a desired position during transport. The posts 32 can be easily installed into and removed from the bases 34 as needed to adjust to varying uses of the cargo truck or other transportation vehicle.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A cargo securement system comprising:
   a post including a footing; and
   a base including a flange and a slot, the flange configured to secure the base in a cargo area of a transportation vehicle and the slot having a non-linear cross-sectional profile configured to removably receive an anchor portion of the footing and support the post in a substantially vertical position.

2. The cargo securement system of claim 1, wherein the slot is defined by at least two slot walls having arcuate shapes.

3. The cargo securement system of claim 1, wherein the post includes a rigid column member with a first end and a second end, the rigid column member connected to the footing at the first end and projecting away from the footing toward the second end.

4. The cargo securement system of claim 3, wherein the footing includes a support ledge, a neck portion and the anchor portion, the neck portion projecting from an opposite side of the support ledge from the anchor portion, the neck portion positioned inside the first end of the rigid column member and the anchor portion projecting into the slot to support the post in the substantially vertical position.

5. The cargo securement system of claim 4, wherein the support ledge projects peripherally outward from the neck portion and the anchor portion and contacts a top surface of the base.

6. The cargo securement system of claim 5, wherein the post includes a plurality of attachment points for securing cargo in the cargo area of the transportation vehicle.

7. The cargo securement system of claim 6, wherein the plurality of attachment points are located on a retention grid secured to an exterior surface of the rigid column member.

8. The cargo securement system of claim 4, wherein the anchor portion has an overall length and an overall width, the overall length being at least twice the overall width.

9. The cargo securement system of claim 8, wherein the anchor portion includes at least one anchor wall with an arcuate shape that corresponds to a slot wall in the footing.

10. A cargo securement system comprising:
    a base secured to and disposed within an aperture of a cargo platform of a vehicle, a top surface of the base being flush with a top surface of the cargo platform, the base including a body portion and a flange extending radially outwardly from the body portion, the body portion including an opening formed therein; and
    a post removably coupled to the base and including an elongated column member and a footing coupled to an end of the column member, the footing at least partially received in the opening formed in the body portion of the base when the post is coupled to the base and removed from the opening when the post is separated from the base.

11. The cargo securement system of claim 10, further comprising fasteners extending through the flange portion of the base and the cargo platform to secure the base to the cargo platform.

12. The cargo securement system of claim 10, wherein the footing includes a neck portion, an anchor portion and a support ledge positioned between the neck portion and the anchor portion and seated on the base, and wherein the anchor portion is received in the opening formed in the body portion of the base when the post is coupled to the base.

13. The cargo securement system of claim 12, wherein a length of the anchor portion is smaller than a length of the column member of the post.

14. The cargo securement system of claim 12, wherein the anchor portion includes opposing arcuate shaped walls that correspond to opposing arcuate shaped walls of the opening.

15. The cargo securement system of claim 14, wherein the opening defines a bottom surface, and wherein a gap exists between the bottom surface and an end of the anchor portion.

16. The cargo securement system of claim 14, wherein the post and the base are in engagement with each other along the opposing arcuate shaped walls of the anchor portion and the opposing arcuate shaped walls of the opening.

17. The cargo securement system of claim 10, further comprising an elongated retention grid attached to a surface of the column member and including a plurality of attachment points spaced apart from each other.

18. A cargo securement system for securing cargo in a cargo area of a vehicle, the cargo securement system comprising:
    a base secured to and disposed within an aperture of a cargo platform of the cargo area and including a body portion and a flange extending radially outwardly from the body portion, the body portion including an opening formed therein, the opening defining a bottom surface;
    a post removably coupled to the base and including:
      an elongated column member; and
      a footing coupled to an end of the column member and at least partially received in the opening formed in the body portion of the base when the post is coupled to the base and removed from the opening when the post is separated from the base, the footing including a neck portion, an anchor portion and a support ledge positioned between the neck portion and the anchor portion and seated on the base, the neck portion coupled to and disposed at least partially into the column member, the anchor portion received in the opening formed in the body portion of the base when the post is coupled to the base and including opposing arcuate shaped walls that correspond to opposing arcuate shaped walls of the opening; and an elongated retention grid attached to a surface of the column member and including a plurality of attachment points spaced apart from each other, wherein a gap exists between the bottom surface of the opening and an end of the anchor portion when the post is coupled to the base, wherein the post and the base are in engagement with each other along the opposing arcuate shaped walls of the anchor portion and the opposing arcuate shaped walls of the opening.

* * * * *